S. Wright,
Locomotive.
N° 540.    Patented Dec. 26, 1837.

UNITED STATES PATENT OFFICE.

SAMUEL WRIGHT, OF PHILADELPHIA, PENNSYLVANIA.

CONSTRUCTION OF LOCOMOTIVE-ENGINES.

Specification of Letters Patent No. 540, dated December 26, 1837.

*To all whom it may concern:*

Be it known that I, SAMUEL WRIGHT, of the city of Philadelphia, in the State of Pennsylvania, have invented certain Improvements in Locomotive Steam-Engines; and I do hereby declare that the following is a full and exact description thereof.

The several distinct improvements which I have made consist, first in the manner of constructing and arranging the supply pump. Secondly in the construction of the slide valve. Thirdly, in the manner of disposing the eccentric, and its connections. Fourthly, in the manner of securing the joints of the steam pipe to the cylinder; and, fifthly, the manner of forming the stuffing box of the steam chest.

Figure 1:
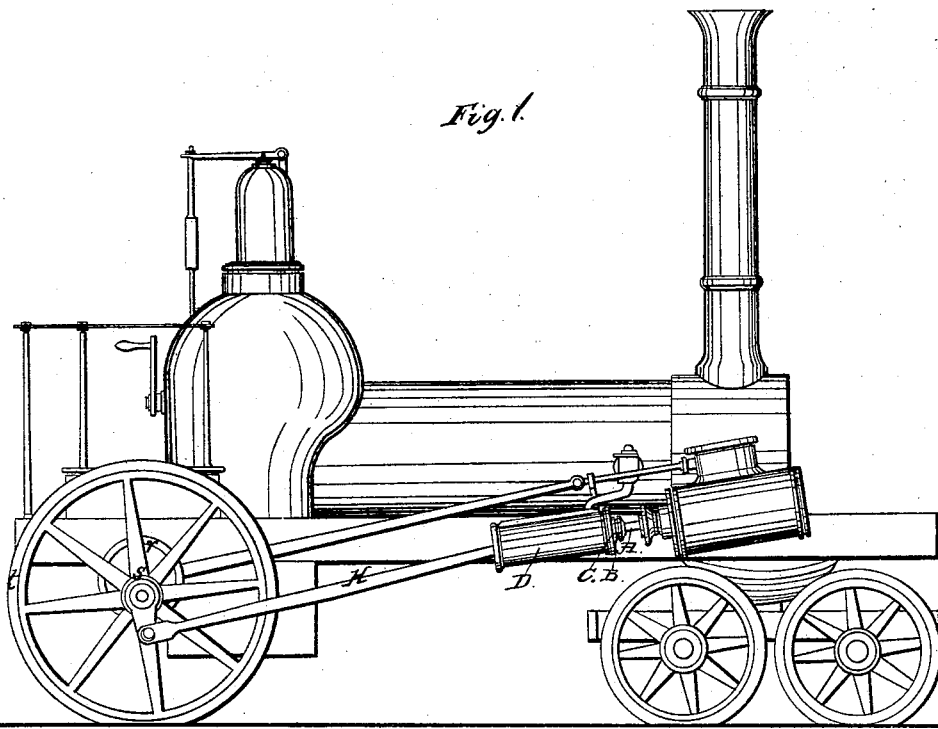

Figure 1, in the accompanying drawing is a side view of my locomotive engine, which excepting the parts designated as constituting my improvements, does not differ from such as have been previously in use.

Figure 2:
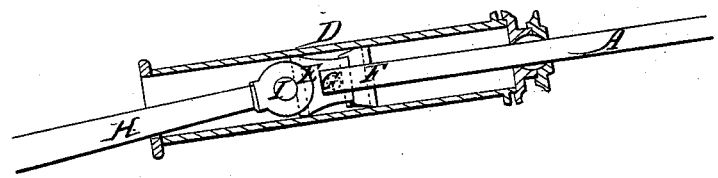

A, Figs. 1, and 2, is the piston rod of the steam cylinder, passing through the stuffing box B, of the supply pump D, of which $c$, is the lid. E, is the piston of the pump, and F, its follower. G, is the key for attaching the piston rod to the piston. H, is the connecting rod for communicating the motion to the driving wheel. I, the wrist pin by which it is connected to the piston. The diameter of the chamber of the pump D, must be such as to allow the connecting rod H, to traverse freely without coming into contact with it. A jaw, or recess, is formed in the end of the piston E, forming a joint with the end of the connecting rod, which vibrates on the joint pin I, the packing of the piston is managed as in other pumps. In this machine the water pipes are placed at the upper end of the pump; these, with their valve chambers, and their auxiliaries may be dispensed with in various ways, without changing those parts which constitute my improvement.

By the above described mode of constructing the supply pump, and the various parts connected therewith, I dispense with the guides, crossheads, couplings, and coupling rods, without requiring any substitute therefor; and by doing this the whole is manifestly much simplified, and less likely to get out of order; the friction is much diminished, and from the increased length of the connecting rod, and other causes therewith, the action is more direct than in other constructions.

What I claim as my invention in this my first improvement, is—

The constructing and connecting the respective parts, consisting principally of the supply pump, its piston, the piston rod of the steam cylinder, and the connecting rod from the driving wheel, substantially in the manner described, so as to subserve the two fold purpose of a pump and guide, dispensing entirely with the parts usually called guides, and their ordinary appendages.

My second improvement consists in the manner of constructing and arranging the slide valve and its appendages.

Figure 3:
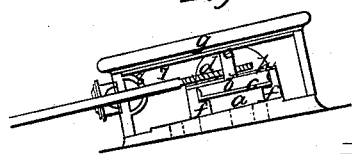
Figure 5:
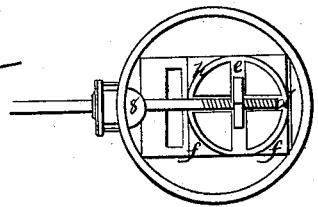

In the drawing $a$, Figs. 3 and 5 represents the valve, being a side and top view thereof, in these figures.

$b$, is the piston; $c$, the follower, attached to the lower part of the piston; $d$, the slot or groove for the valve rod; $e$, the slot or groove for the regulating nut; $f$, the abutments of the valve; $g$, the bonnet of the steam chest, and $h$, the rim of the piston to form a joint with the valve when down. The piston is to be inserted in the valve $a$, and packed steam tight; when steam is admitted on the upper side of the valve $a$, and the piston $b$, it will by its elastic force, press the piston $b$, into the valve $a$, until the rim $h$, forms a junction with the valve $a$. To effect this the surface of the rim $h$, is furnished with a steam tight bearing, there being a corresponding surface on the valve $a$. The valve then acts in a manner similar to that of the common slide valve. In reversing the action of the engine the steam is to be admitted on the inner surface of the valve $a$, through the medium of the exhaust opening; and as the action of the steam then tends to force the valve from its seat, it is necessary to balance this by some counteracting force, and this is effected by the piston $b$, which recedes from the pressure until arrested by the bonnet $g$. To avoid any tendency in the valve to rise, from any friction of the packing, the abutments $f$, $f$, are introduced, upon which the steam reacts.

What I claim as new in this my second improvement, is—

The particular manner of constructing and arranging the valve, the piston, the bonnet of the steam chest, and the abutments as herein described, and for the puposes set forth.

My third improvement consists in the manner of disposing or arranging the eccentric, and its connections, by which I am enabled to dispense with much of the subordinate machinery, or apparatus ordinarily connected with this part of the engine.

In the drawing Fig. 1, $r$ represents the eccentric, which is bolted, or otherwise fastened on the inner side of the driving wheel $t$. The arms of the driving wheel are to be recessed so as to admit of its introduction, the eccentric $r$, being made to embrace the hub $s$. A direct communication with the valve is thus obtained, by the aid of a straight rod extending to it from the eccentric.

What I claim in this part is—

The attaching the eccentric to the driving wheels, and making a direct communication therefrom to the valve in the manner described.

Figure 4:
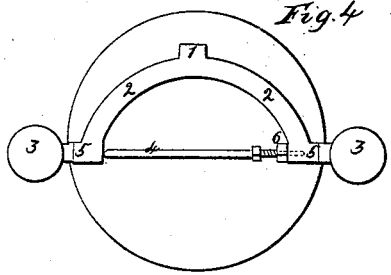

My fourth improvement consists in a new and improved method of securing the joinings of the steam pipe, and cylinder. The manner of doing this is shown in Fig. 4. Where No. 1, is the pipe communicating with the throttle. Nos. 2, 2, are the branch pipes to the cylinders; 3, 3, the steam cylinders; 4, is a bolt having a nut topped on one of its ends; 5, 5, are the flanches of the steam pipe, and 6, the nut of the bolt 4. In applying this apparatus the nut 6, is to be forced against the flanch 5, when the reaction of the bolt against the opposite flanch, will extend the pipes 2, 2, until the flanches 5, 5, are in such contact with the cylinder 3, 3, as to be steam tight. By this arrangement the joints are united and detached more readily than by any other mode heretofore known, whilst the parts are constructed at a less cost.

I claim in this part—

The particular arrangement of the apparatus, by means of which the screw bolt and nut, 4 and 6, are made so to operate as to produce the results set forth.

My fifth improvement consists in the manner of forming the stuffing box of the steam chest inside. This steam chest, as constructed by me, is perfectly circular on its outer surface; is without flanches or stuffing box, and may be finished perfectly in the lathe.

No. 7, Fig. 3, is a representation of the steam chest, and No. 8, the female portion of the stuffing box, which is cast with the steam chest.

What I claim as my improvement in this part is—

The manner of constructing or forming, the stuffing box of the steam chest, as described, the peculiar character of which will be obvious to every competent machinist.

SAMUEL WRIGHT.

Witnesses:
  W. Thompson,
  Linton Thorn.